United States Patent [19]
Miyazaki

[11] Patent Number: 5,979,995
[45] Date of Patent: Nov. 9, 1999

[54] CONTROL METHOD FOR ANTILOCK BRAKING SYSTEMS WITH STRESS SENSOR AND MEASUREMENT DEVICE OF WHEEL OPERATING FORCE

[75] Inventor: Nagao Miyazaki, Osaka, Japan

[73] Assignee: Japan Electronics Industry, Ltd., Osaka, Japan

[21] Appl. No.: 08/715,730

[22] Filed: Sep. 19, 1996

[51] Int. Cl.⁶ ...................................................... B60T 8/52
[52] U.S. Cl. .......................................... 303/112; 303/150
[58] Field of Search ................... 303/112, 113.1, 303/150, 221, 163

[56] References Cited

U.S. PATENT DOCUMENTS

| | | | |
|---|---|---|---|
| 4,453,781 | 6/1984 | Poggie | 303/112 |
| 5,333,543 | 8/1994 | Kashiwabara et al. | 303/112 |
| 5,409,302 | 4/1995 | Chabbert | 303/112 |
| 5,419,624 | 5/1995 | Adler et al. | 303/112 |

*Primary Examiner*—Matthew C. Graham
*Attorney, Agent, or Firm*—Jones, Tullar & Cooper, P.C.

[57] ABSTRACT

An antilock braking system employing stress sensors installed in the wheel axle structure of a motor vehicle. The stress sensors measure a road surface frictional force and a braking torque. A parameter calculating means calculates a parameter M from these measured values. An ABS control means terminates a braking pressure reduction process in accordance with the change in the parameter M. Thereby, the system can preclude the locking of the wheel of the motor vehicle even when the brake is suddenly applied, can prevent the braking pressure reduction from being over controlled, and makes possible braking loss minimization.

6 Claims, 22 Drawing Sheets

CONTROL METHOD FOR ANTILOCK BRAKING SYSTEMS WITH STRESS SENSOR AND MEASUREMENT DEVICE OF WHEEL OPERATING FORCE

BACKGROUND OF THE INVENTION

I. Field of the Invention

The present invention relates to a control method for antilock braking systems capable of precluding the locking of the wheels of a motor vehicle on sudden application of the brake and to a measurement device of the vehicle wheel operating force capable of using antilock braking systems.

II. Prior Art

If the wheels of a motor vehicle are locked upon application of the brake of the motor vehicle, rotation of the affected wheels is prevented followed by tire slipping on the road surface. Such a condition means less vehicle controllability.

Antilock braking systems (ABS) are control systems capable of preventing the wheel from locking during the braking process. Generally, a conventional antilock braking systems for motor vehicles employ a system such that the braking action is automatically controlled in accordance with the speed of the vehicle wheel. The vehicle wheel speed is measured using a wheel speed sensor. This wheel speed sensor has structure which measures rotational velocity of the vehicle wheel by detecting the speed of rotation of a geared hub attached on the wheel axle with the use of a magnetic pick-up.

The control procedure of the conventional antilock braking system is as follows: when braking is suddenly applied, the locking of wheel is detected by the rapid decreases of the wheel speed. The control system responds by reducing braking pressure. Thereafter, when the wheel speed recovers due to the reduction in braking pressure, braking is again applied. In such a control method, however, the effect of brake control is lost in fact during a period from the occurrence of the wheel locking to the resumption of the braking process. Consequently controllability becomes unstable and it results in a longer stopping distance for the vehicle.

In one conventional antilock braking system, control of the system is commenced by using an arbitrarily chosen control method and parameter settings. Thereafter the slipping frequency is counted during control and the friction coefficient of the road surface on the basis of the counted slip frequency is estimated. When the slip frequently occurs, the control method is changed to a method suitable for the road surface having a lower friction coefficient, and when there is no slip, it is switched to a method suitable for the road surface having a higher friction coefficient. However, such a control method causes an increase in the loss of the breaking force during tire slipping and results in a longer stopping distance for the vehicle.

It is possible to control the operation of antilock braking systems by using a measured value of a stress applied on the vehicle wheel. There are known a photoelasticity method; a brittle coat method; a holography method; a strain gauge method, etc. as methods measuring stress about a structure. Generally, the strain gauge method is widely used, but it is difficult to detect an intended stress value because it receives forces other than the stress to be measured. In particular, there is no method detecting side forces.

SUMMARY OF THE INVENTION

An object of the present invention is to provide a control method for antilock braking systems without using a measured value of speed of a vehicle wheel as a control parameter.

Another object of the present invention is to provide an optimum braking control method for antilock braking systems using as a control parameter the values measured by stress sensors installed in the wheel axle structure of the vehicle for control action.

A further object of the present invention is to provide a control method for antilock braking systems capable of preventing a braking pressure reduction from being over controlled and minimizing braking loss.

A further object of the present invention is to provide a control method for antilock braking systems capable of estimating a maximum road surface friction coefficient and thereby selecting an optimum control procedure or a parameter setting.

A further object of the present invention is to provide a measurement device of the vehicle wheel operating force capable of using antilock braking systems.

According to the present invention the antilock braking systems have at least one stress sensor, and the control method comprises the steps of: detecting outputs proportional to a road surface frictional force and a braking torque by using the stress sensor, determining the road surface frictional force and the braking torque from the detected outputs; calculating a parameter from the determined road surface frictional force and braking torque; monitoring a change in the parameter after a time at which a braking pressure reduction process has been initiated; and terminating the braking pressure reduction process in accordance with the change in the parameter; thereby the system can prevent the braking pressure reduction from being over controlled, can make minimizing the braking loss possible, and can preclude locking of the wheel of the motor vehicle upon sudden application.

These and other advantages and objects of the present invention will be apparent upon reference to the following detailed description taken in connection with the following drawings.

DESCRIPTION OF THE PREFERRED EMBODIMENTS

Preferred embodimentes according to the present invention will be described hereinafter. Other embodiments will be apparent upon reference to the following detailed description.

An embodiment of a control method for terminating the process of a braking pressure reduction mode in antilock braking systems with stress sensors according to the present invention will now be described.

In this embodiment, the stress sensor is a device which can produce output values used for control operation. The output values are the values proportional to a road surface frictional force F, and a braking torque T respectively. It is known that devices can be made with, for example, a strain gauge or equivalent.

Figure 1:
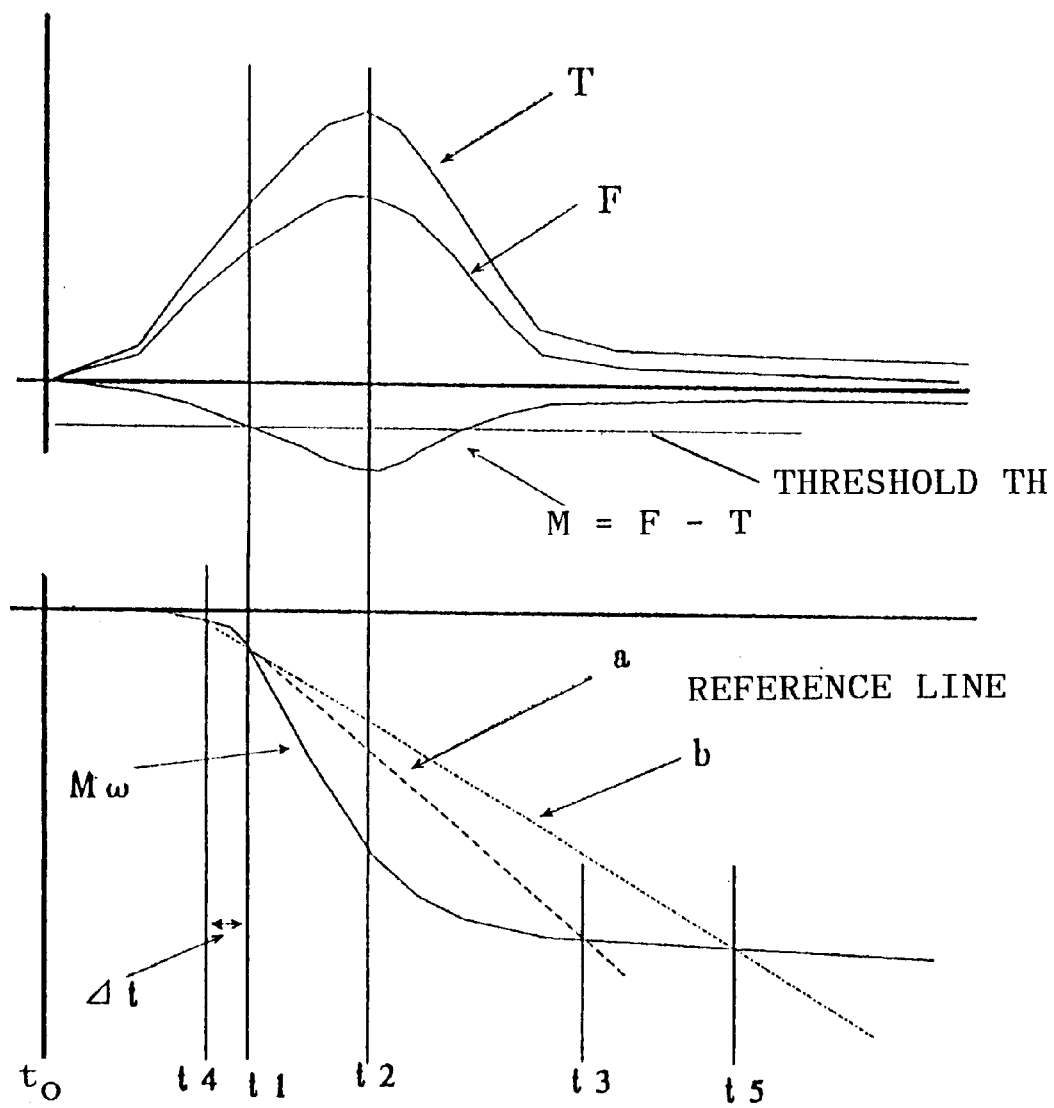
FIG. 1 is a graphical representation illustrating the typical response of values measured by the stress sensor and parameters calculated from the measured values, when the brake of the vehicle is suddenly applied, according to an embodiment of an antilock braking system of the present invention.

FIG. 1 is a graphical illustration representing a typical response of the road surface frictional force F and the braking torque T detected by the stress sensor and the control parameters M calculated from the detected F and T when braking of the motor vehicle is suddenly applied. FIG. 1 shows that the road surface frictional force F and the braking torque T are continuously increased and the control parameter M given by an equation $M=F-T$ is continuously decreased during a period ($t_0-t_1$) in which the braking of the motor vehicle is being applied, after sudden application of the brake at the time $t_0$. As the parameter M has a negative value, a parameter $M_w$, which is the integral of the parameter M with respect to t, is also decreased with the passage of time.

For precluding the locking of the wheels of the motor vehicle, the desired control action for the movement process toward the braking pressure reduction mode is initiated at the time $t_1$ at which time the parameter M has become more than a predetermined threshold TH. From this time on, for some time, the parameter M keeps decreasing and then the degree of decrease in the parameter $M_w$ increases. From the time $t_2$ at which time the effect of the braking pressure reduction appears, the road surface frictional force F and the braking torque T decrease, the parameter M begins to increase, and the degree of decrease in the parameter $M_w$ is lessened significantly.

Figure 2:
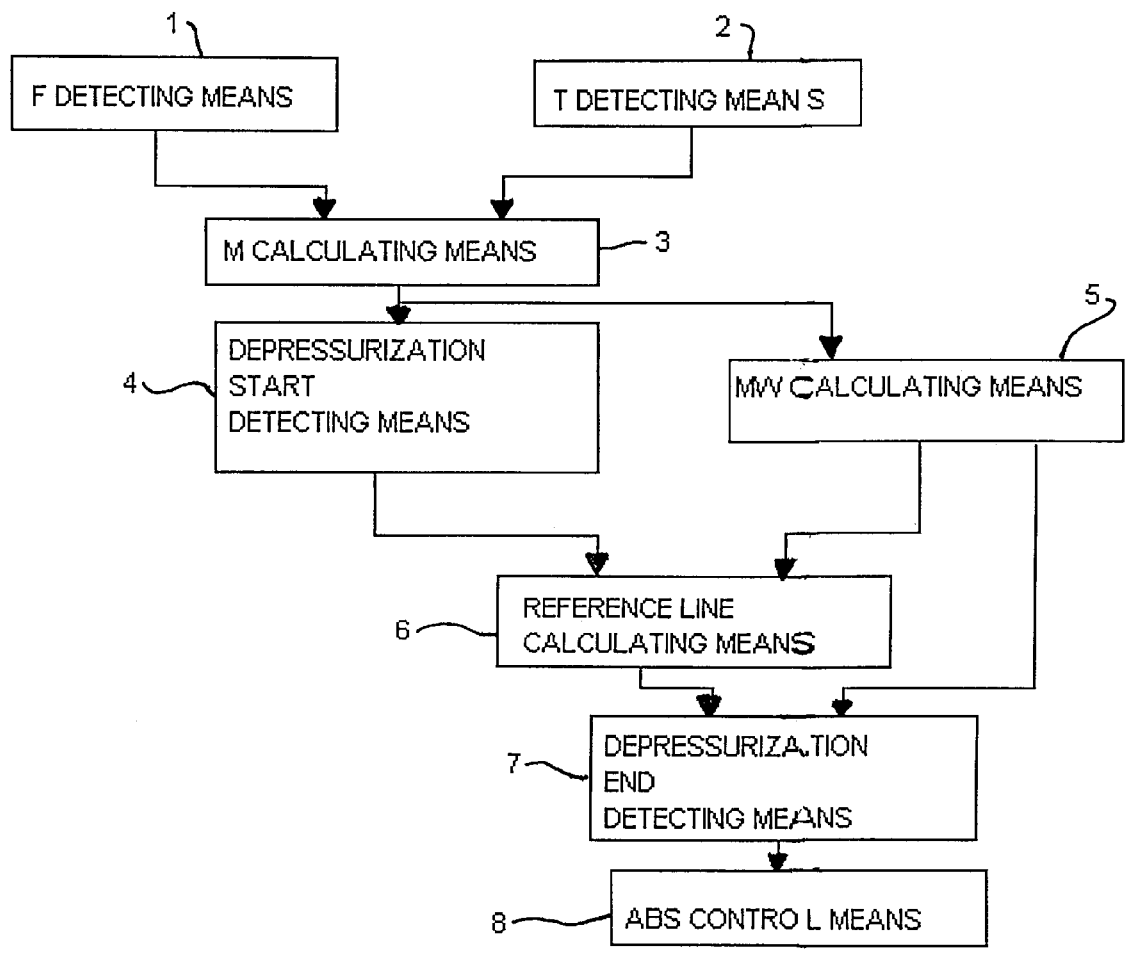
FIG. 2 is a block diagram illustrating the embodiment of the antilock braking system according to the present invention.

FIG. 2 is a block diagram representing the function of an embodiment of the antilock braking system according to the present invention. A parameter M calculating means 3 calculates the parameter M from F and T detected by detecting means 1 and 2 (stress sensor means). A parameter $M_w$ calculating means 5 calculates the parameter $M_w$ by integrating the parameter M. A depressurization end detecting means 7 monitors the change in the slope of the parameter $M_w$, detecting the effect of the braking pressure reduction. An ABS control means 8 having an actuator terminates the control process for the braking pressure reduction when the effect of the braking pressure reduction has been detected. Such processing prevents the braking pressure reduction from being over controlled and therefore makes minimizing the braking loss possible.

The amount of change in parameters M and $M_w$ vary in accordance with the variation in vehicle velocity, the road surface friction coefficient, etc. Therefore it is necessary to modify the decision criteria for terminating the braking pressure reduction based on the change in the slope of the parameter Mw, and such modification complicates the judgment of the depressurization termination. Then, when a depressurization start detecting means 4 has detected the time $t_1$ at which the braking pressure reduction mode initiates, the slope of the parameter $M_w$ at the time $t_1$ is determined by a reference line calculating means 6. The reference line calculating means 6 produces a reference line "a" (FIG. 1) which is a straight line having the slope equal to the slope of the parameter $M_w$ at the time $t_1$. The depressurization end detecting means 7 detects a time $t_3$ at which the curve of the parameter $M_w$ intersects the reference line "a". The ABS control means 8 having an actuator terminates the control process for the braking pressure reduction mode at the time $t_3$. Preparation of the complicated decision criteria for terminating the braking pressure reduction is useless using this control method. This simple method comparing the parameter $M_w$ with the reference line "a" prevents the braking pressure reduction from being over controlled and makes possible braking loss minimization.

In the case where the reference line equals the straight line having the slope of the parameter $M_w$ at the time $t_1$, a signal representing termination of the depressurization may be outputted even when the braking pressure reduction has an insufficient condition. Hence, when the depressurization start detecting means 4 has detected the time $t_1$ at which the braking pressure reduction mode initiates, the reference line calculating means 6 measures a first value of the parameter $M_w$ at the time $t_1$ and a second value of the parameter $M_w$ at a time $t_4$ preceded by a predetermined time from the time $t_1$, and produces a reference line "b" (FIG. 1) passing the first and the second values of the parameter $M_w$. The depressurization end detecting means 7 detects a time $t_5$ at which the curve of the parameter $M_w$ intersects the reference line "b". The ABS control means 8 having the actuator terminates the control process for the braking pressure reduction mode (at the time $t_5$). Such a method prevents the braking pressure reduction from being over controlled and makes possible braking loss minimization.

In the case where the braking pressure reduction control is performed in the vicinity of the peak of the road surface frictional force on the road having a very low road surface friction coefficient, if the braking pressure reduction is not enough, the road surface frictional force reaches its peak again immediately after terminating the braking pressure reduction process. As a result, wheel locking is caused and vehicle controllability is lost. Then, the preceded time period $\Delta t$ ($\Delta t = t_4 - t_1$) is modulated in accordance with the variation of the road surface friction coefficient. As modulation of the period $\Delta t$ changes, the slope of the reference line "b", the time $t_5$, at which the curve of the parameter $M_w$ intersects the reference line "b", also changes, and it makes possible adjustment of the time for terminated the braking pressure reduction process. That is, the period for the braking pressure reduction process can be adjusted to the period suitable for the actual value of the road surface friction coefficient by using the method mentioned above. This control method performs the braking pressure reduction process during the period suitable for the road surface friction coefficient and prevents the braking pressure reduction from being over controlled and makes possible braking loss minimization.

Another embodiment of a control method capable of using methods suitable for the value of the road surface friction coefficient in antilock braking systems with stress sensors according to the present invention will now be described.

In this embodiment, the stress sensor is a device which can produce output values used for control operation. The output value is the value proportional to a road surface frictional force F. It is known that such a device can be made with, for example, a strain gauge or equivalent.

Figure 3:
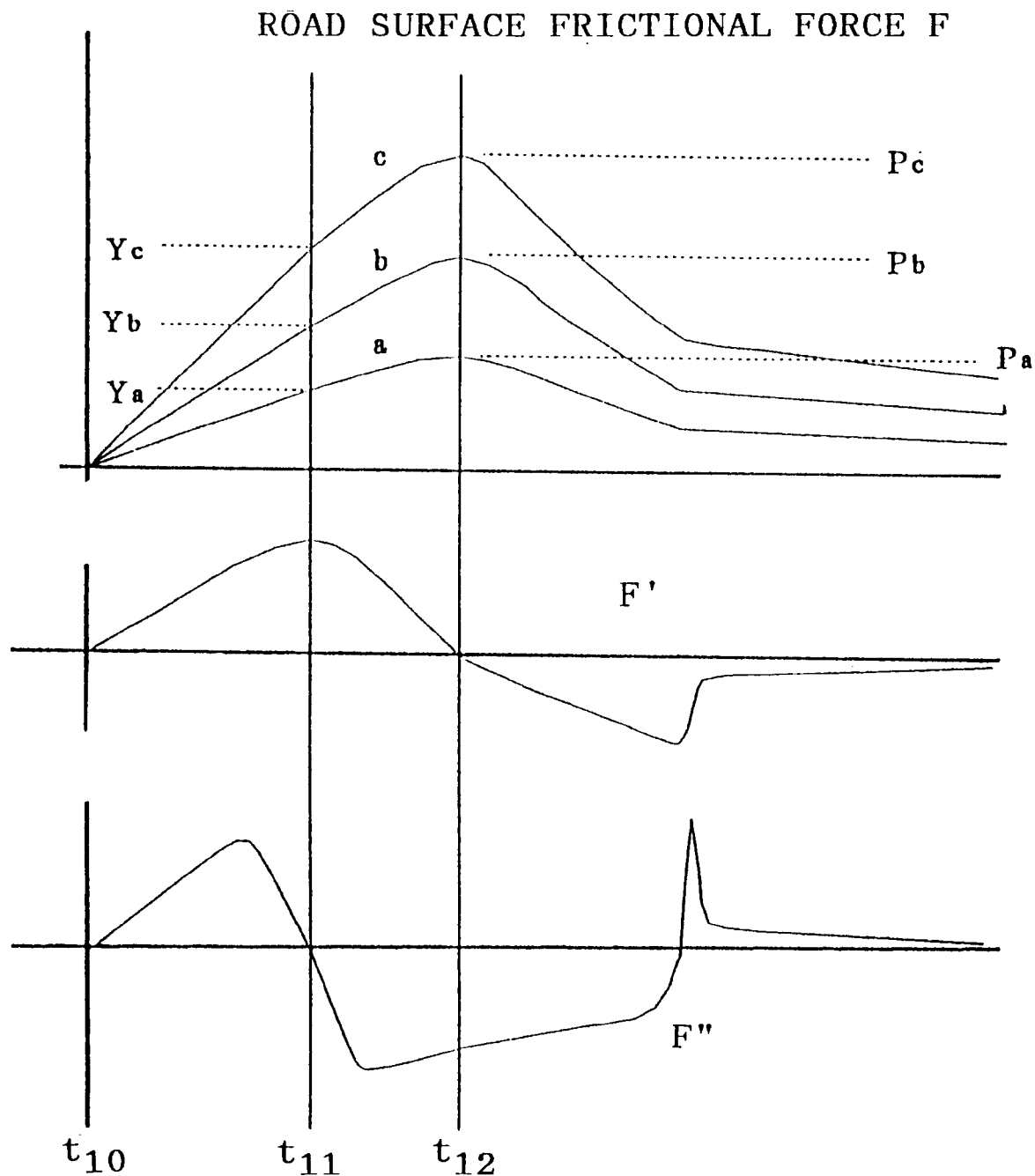
FIG. 3 is a graphical representation illustrating the typical response of values measured by the stress sensor and parameters calculated from the measured values, when the brake of the vehicle is suddenly applied, according to another embodiment of an antilock braking system of the present invention.
Figure 4:
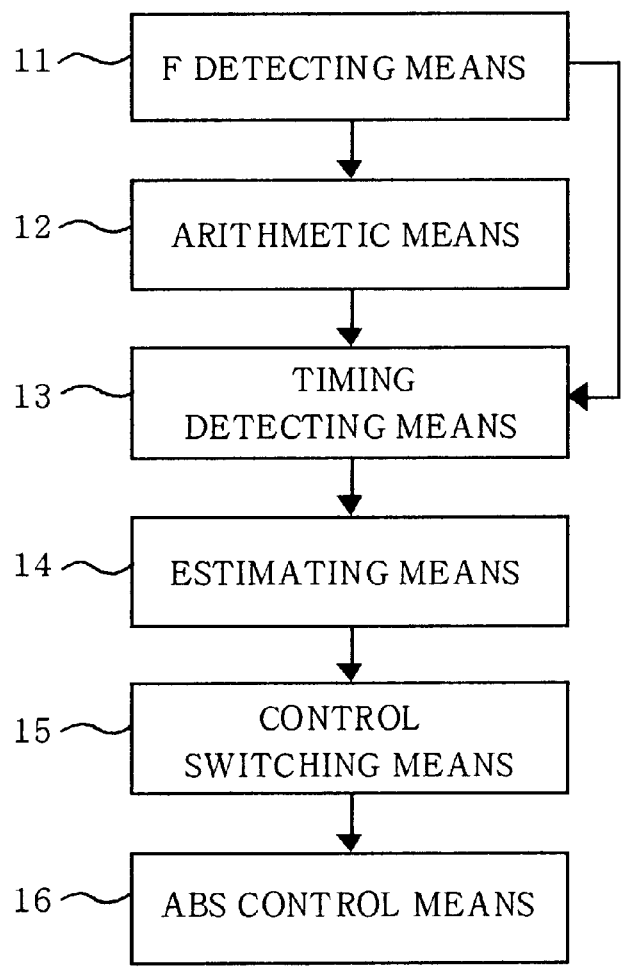
FIG. 4 is a block diagram illustrating the embodiment of FIG. 3 according to the present invention.

FIG. 3 is a graphical illustration representing a typical response of the road surface frictional force F ("a", "b", "c") detected by the stress sensor, a first derivative F' of the road surface frictional force F, and a second derivative F" of the road surface frictional force F when the braking of the motor vehicle is suddenly applied. Curves "a", "b", and "c" representing the road surface frictional force F correspond to three maximum road surface friction coefficients respectively. The road surface having a higher maximum road surface friction coefficient shows the road surface frictional force having a larger peak value. FIG. 4 is a block diagram representing the function of this embodiment of the antilock braking system according to the present invention.

Immediately after applying braking at the time $t_{10}$, the road surface frictional force measured value F increases monotonically with the elapse of time as shown in FIG. 3. Curves "a", "b" and "c" show the road surface frictional force measured values for the road surface having low, middle, and high maximum road surface friction coefficients respectively. The road surface frictional force F increases as encrements of the maximum road surface friction coefficient. As a certain limit of frictional force obtained from the road surface, however, is exceeded, the measured value F has a peak value at a time $t_{12}$ and then begins to decrease. The timing detecting means 13 shown in FIG. 4 detects the time $t_{12}$ at which the road surface frictional force measured value F has reached a peak value. The values of the road surface frictional force measured value F vary in such a way that the values have Pb, and Pc for roads having low, middle, and high maximum friction coefficient respectively, and an estimating means 14 estimates the actual value of the maximum road surface friction coefficient from the magnitude of the measured peak value of the road surface frictional force. A control switching means 15 selects the optimum one among a plurality of control procedure or parameter settings programmed beforehand on the basis of analysis of the estimated maximum friction coefficient. Then, an ABS control means 16 having an actuator conducts a control of the antilock braking system in accordance with an optimum control procedure or parameter settings selected by the control switching means 15.

Because of a mechanical time delay, if the control process has been commenced after the road surface frictional force F has reached its peak value, the road surface frictional force F causes a reduction when the control effect is actually brought into play 1 and therefore wheel the slip has been increased. Then, an arithmetic means 12 takes the derivative F' of the road surface frictional force F. The timing detecting means 13 detects a time $t_{11}$ at which the derivative value F' has reached peak value. The values of the road surface frictional force at the time $t_{11}$ vary in such a way that the values have Ya, Yb, and Yc for the curves "a", "b", and "c" respectively, the estimating means 14 estimates the actual maximum road surface friction coefficient from the relationship between these values of the frictional force and maximum road surface friction coefficient. The control switching means 15 selects the optimum one among a plurality of control procedures or parameter settings programmed beforehand on the basis of analysis of the estimated maximum friction coefficient of the road surface. Then, the ABS control means 16 having the actuator carries out the control of the antilock braking system in accordance with the optimum control procedure or parameter settings selected by the control switching means 15. As this method estimates the friction coefficient of the road surface before the road surface frictional force reaches its peak value and commences the selected control operation, the wheel slip does not increase and therefore optimum control of the antilock braking system can be carried out.

The peak value of the derivative F' is difficult to find it. For finding the peak of the derivative value F', it is necessary to repeat a comparison of former data and latter data of the derivative value F'. However, this can be easily found by the following method. That is, the second derivative F" of the road surface frictional force F is calculated by the arithmetic means 12. The instant that the second derivative F" has switched from plus to minus is detected by the timing detecting means 13. This instant is the time $t_{11}$ at which the first derivative F' has reached its peak. Just as in the case mentioned above, the estimating means 14 estimates the actual maximum road surface friction coefficient, the control switching means 15 selects optimum control procedure or parameter settings, and then the ABS control means 16 conducts the optimum control of the antilock braking system. In this method, memory for the past data of the derivative F' is not required, detection only of the instant that the second derivative F" is switched from plus to minus is required. Therefore, estimation of the maximum friction coefficient of the road surface can be performed easily.

The embodiments described above employ the stress sensor means as F detecting means or T detecting means.

Such stress sensor means has been disclosed, for example, in Japanese Patent Laid-Open Publication No.4-331336. The stress sensor means is installed in a hole formed on the wheel axle structure of the motor vehicle.

An embodiment of the measurement device of a wheel operating force capable of being applied to a motor vehicle, in particular, a passenger automobile according to the present invention will be described.

Figure 5:
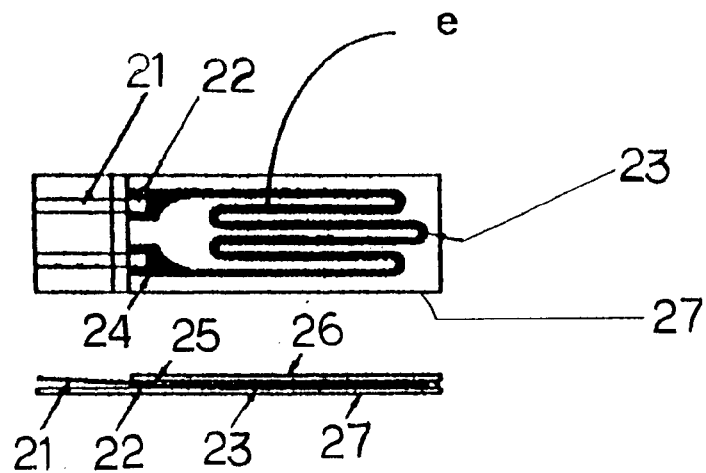
FIG. 5 is a plan view of an example of an uniaxial strain gauge.

FIG. 5 is a plane view of an example of a uniaxial strain gauge "e". A resistance element 23 acting as a sensitive part employs a Ni—Cr alloy film, an Si film, and the like. A base 27 is usually made of an insulation material such as polyimide resin, silicon oxide, and the like.

Figure 6:
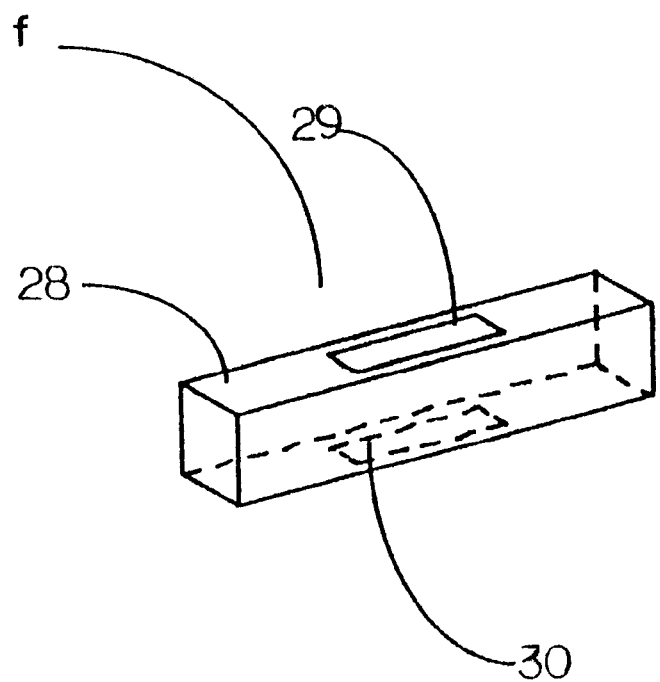
FIG. 6 is a schematic perspective view of a sensor segment.

FIG. 6 is a perspective view of a sensor segment "f" having a substrate 28 which the strain gauges are mounted. The substrate 28 is usually made of a metal or silicon or the equivalent. An "a" uniaxial strain gauge 29 is mounted on the obverse face of the substrate 28 and a "b" uniaxial strain gauge 30 is mounted on the reverse face of the substrate 28.

Figure 7:
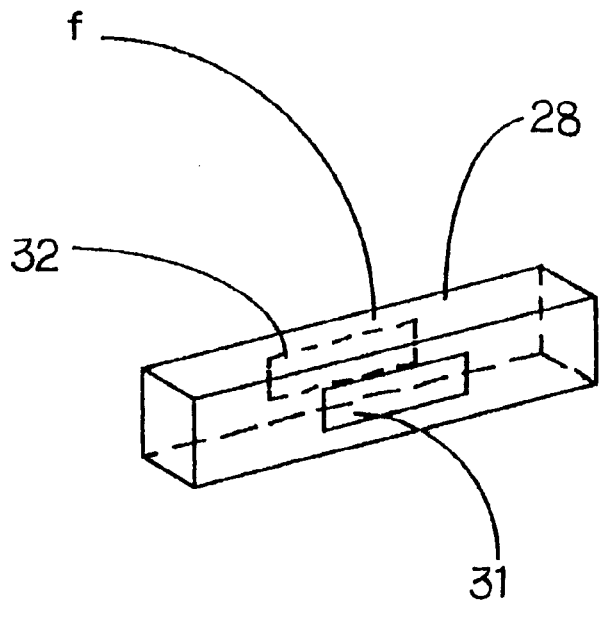
FIG. 7 is a schematic perspective view of a sensor segment.

FIG. 7 shows another sensor segment for measuring stress having a direction different from the sensor segment "f" shown in FIG. 6. This structure is the same as that of FIG. 6 except for the position of the sensor segment. A "c" uniaxial strain gauge 31 is mounted on the side face on the substrate 28 and a "d" uniaxial strain gauge 32 is mounted on the other side face on the substrate 28. The angle between the "a" strain gauge 29 and the "c" strain gauge 31 is 90°.

Figure 8:
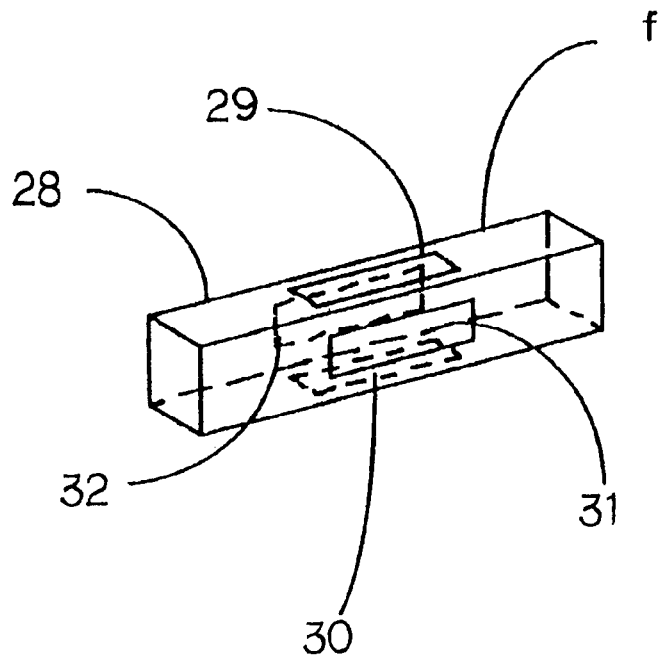
FIG. 8 is a schematic perspective view of a sensor segment.

FIG. 8 is a perspective view of a composite sensor segment having the "a", "b", "c" and "d" uniaxial strain gauges 29, 30, 31, and 32 shown in FIGS. 6 and 7.

Figure 9:
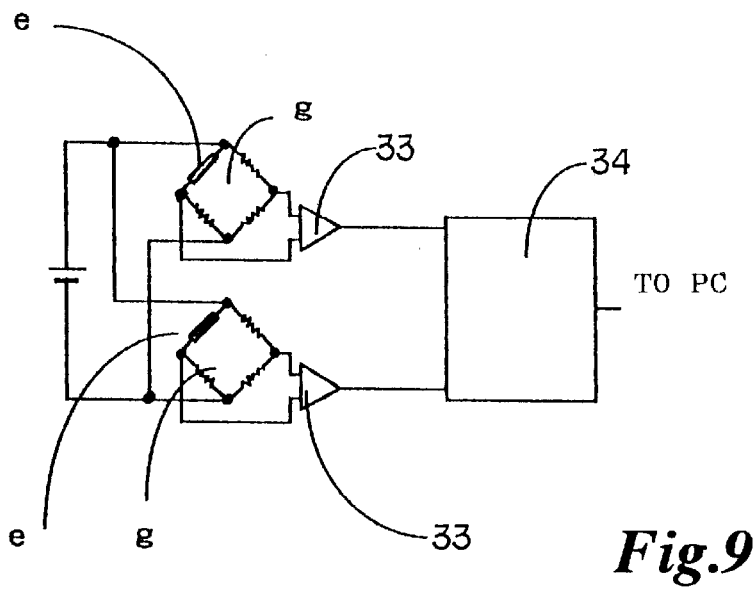
FIG. 9 is a block diagram of a stress sensor including the sensor segments as shown in FIGS. 6 and 7.

FIG. 9 is a block diagram of a stress sensor means including the sensor segments as shown in FIGS. 6 and 7. In FIG. 9 each strain gauge constitutes one branch of a bridge circuit "g", the output of the bridge circuit "g" is amplified by an amplifier 33, and the amplified output is fed to a digital signal processor (DSP) 34. The output of the DSP 34, for example, can be connected to a personal computer for control use.

Figure 10:
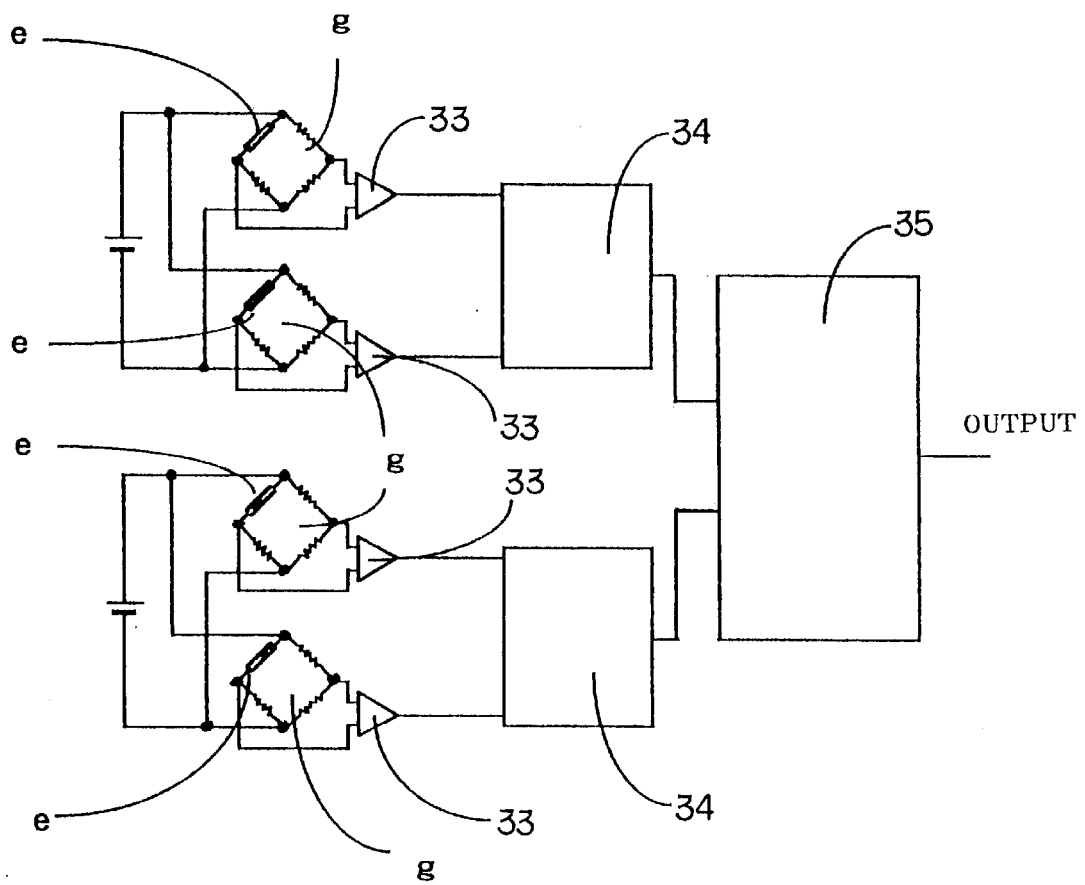
FIG. 10 is a block diagram of a stress sensor including the composite sensor segment as shown in FIG. 8.

FIG. 10 is a block diagram of a stress sensor means including the composite sensor segment as shown in FIG. 8. In FIG. 10 there are two sets of the circuit shown in FIG. 9 and an output of each DSP 34 is inputted to a central processing unit (CPU) 35.

Figure 11:
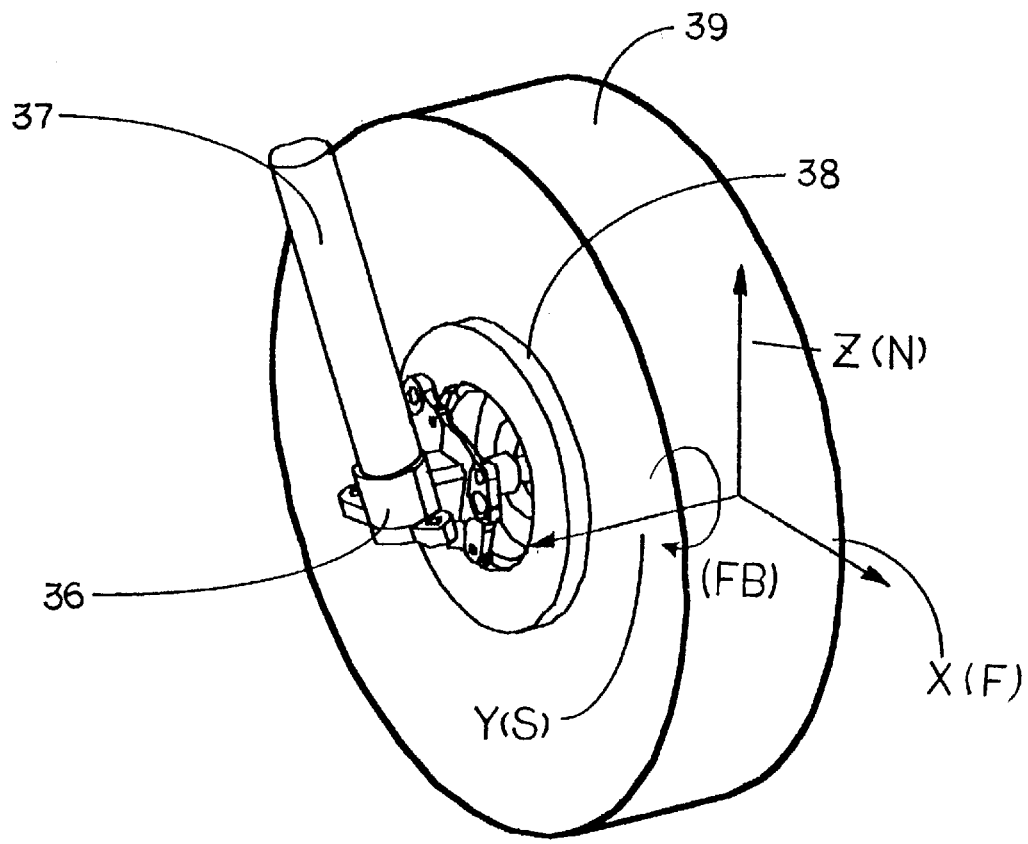
FIG. 11 is a schematic perspective view of an axle structure with a tire.
Figure 12:
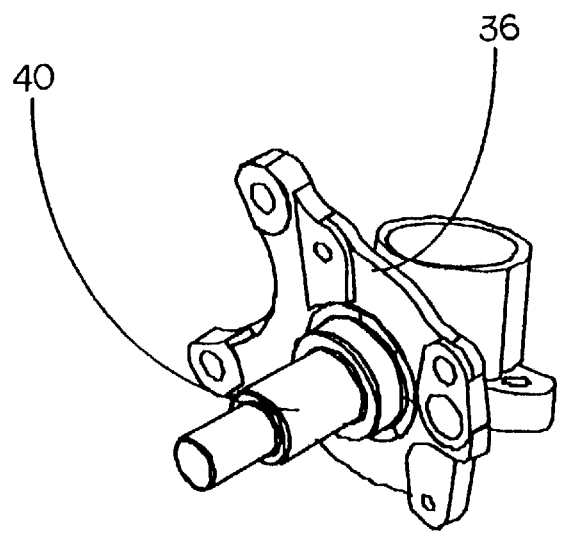
FIGS. 12, 13, 14, 15, 16 and 17 are schematic perspective views illustrating a variety of structures about the axle.
Figure 13:
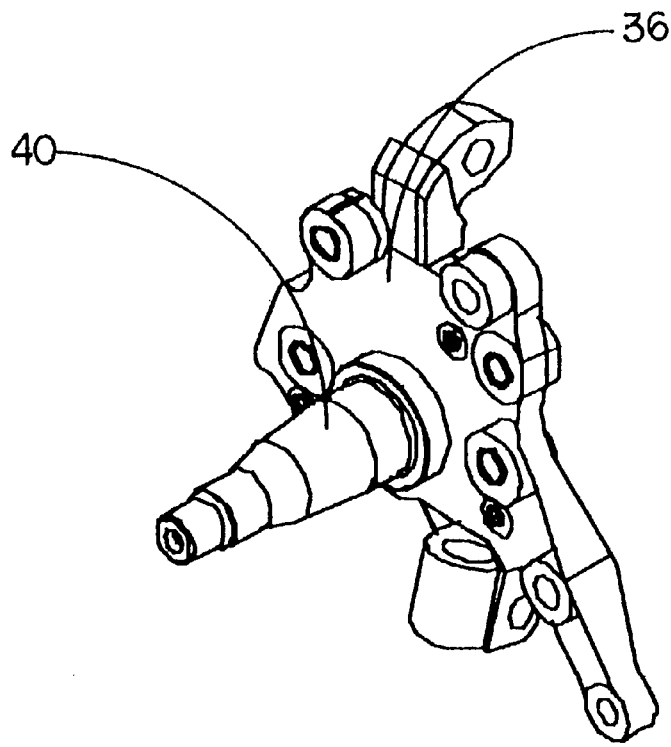
Figure 14:
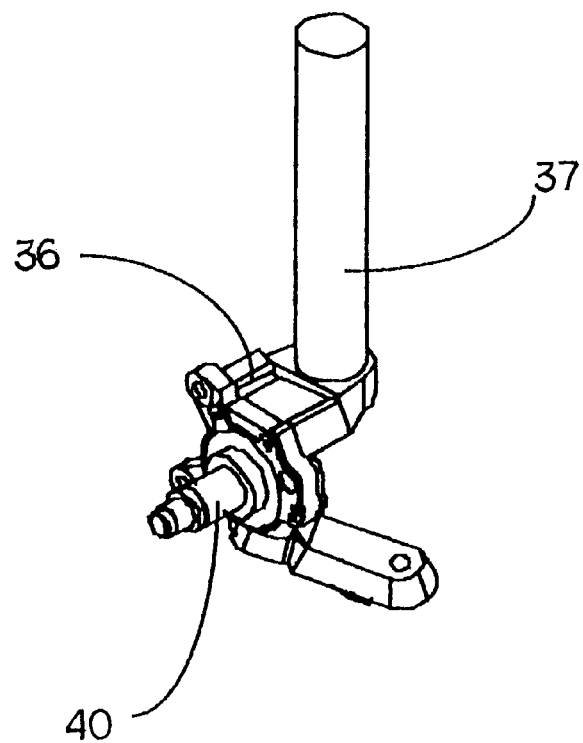
Figure 15:
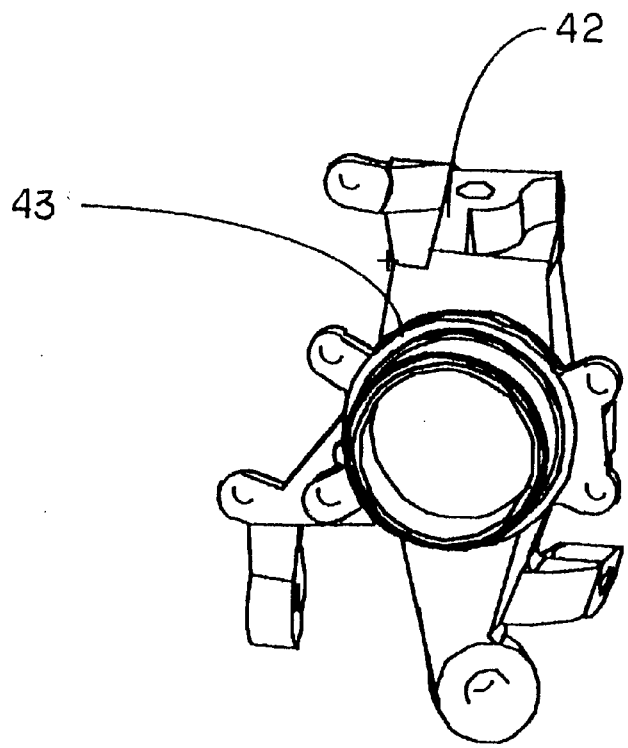
Figure 16:
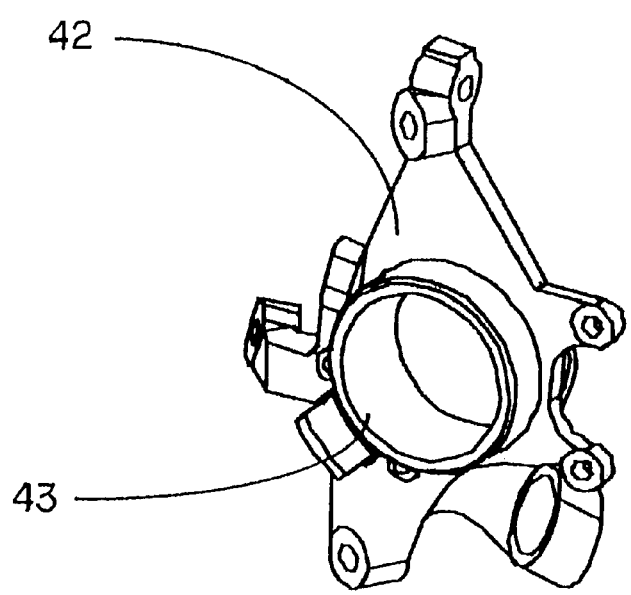
Figure 17:
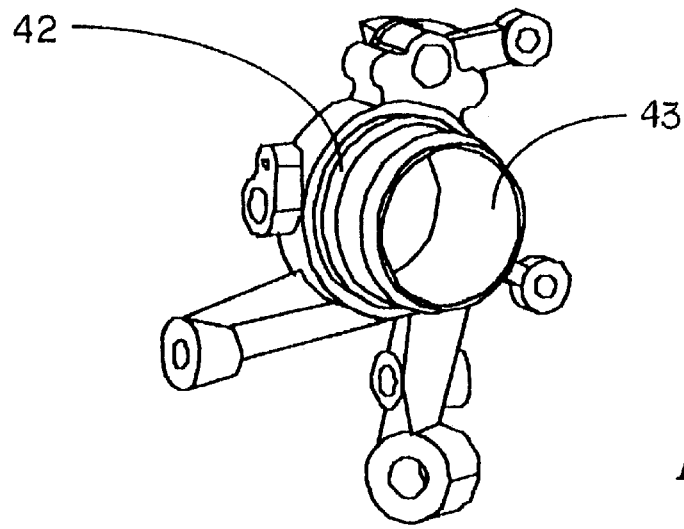

Next, the axle structure of the vehicle will be described. FIG. 11 is a schematic perspective view of the axle structure and the tire. A horizontal direction (F direction) with respect to the road surface, a vertical direction (N direction) with respect to the road surface, and an axle center direction (S direction) are defined as an axis X, an axis Z, and an axis Y respectively. A torsional moment (FB direction) about the axis Y is defined as FB.

In the axle structure 36 a shock absorber 37 is installed. In the axle side a brake disk 38 is installed via a bearing. The tire 39 is installed in such a way as to cover the brake disk 38.

A variety of structures about the axle are shown in FIGS. 12–17. Numerals 40, 42 and 43 are the axle, a structure 42 close to the axle 40, and a hole 43 for the axle 40. A hole 41 for attaching the sensor as mentioned above is drilled into the structures as shown in FIGS. 12–17.

Figure 18:
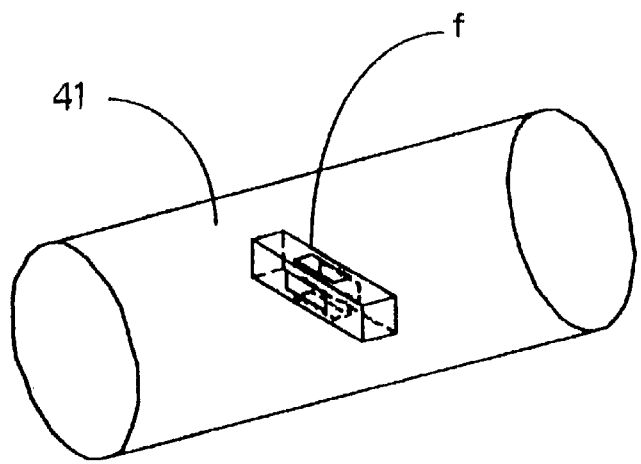
FIG. 18 is a schematic perspective view illustrating a sensor segment in a sensor hole.

FIG. 18 is a schematic perspective view illustrating the sensor segment "f" in the sensor hole 41. When a force in the F direction (X axis) is applied to the axle, the substrate 28 of the sensor segment "f" receives a shearing strain. Two strain gauges, "a" strain gauge 29 and "b" strain gauge 30, expand and these resistances change by $\Delta a$ and $\Delta b$. The DSP 34 determines a stress of F direction by the following equation:

$$F = k_F(\Delta a + \Delta b) \tag{1}$$

When a force in the N direction (Z axis) Is applied to the axle, the substrate 28 of the sensor segment "f" receives contraction and expansion stress and it bends. Two strain gauges, "a" strain gauge 29 and "b" strain gauge 30, contract and expand and these resistances change by $-\Delta a$ and $\Delta b$. The DSP 34 determines a stress in the N direction by following equation:

$$N = k_N(\Delta b - \Delta a) \tag{2}$$

When a force in the S direction (Y axis) is applied to the axle, the substrate 28 of the sensor segment "f" receives contraction stress. Two strain gauges, "a" strain gauge 29 and "b" strain gauge 30, contract and these resistances change by $-\Delta a$ and $\Delta b$. The DSP 34 determines a stress in the direction by following equation:

$$S = k_s(\Delta a + \Delta b) \tag{3}$$

When a force in the FB direction is applied to the axle, the substrate 28 of the sensor segment "f" receives expansion and contraction stress and it is twisted. Two strain gauges, "a" strain gauge 29 and "b" strain gauge 30, expand and contract and these resistances change by a and −b. The DSP 34 determines a stress in the FB direction by the following equation:

$$FB = k_T(\Delta a - \Delta b) \tag{4}$$

Figure 19:
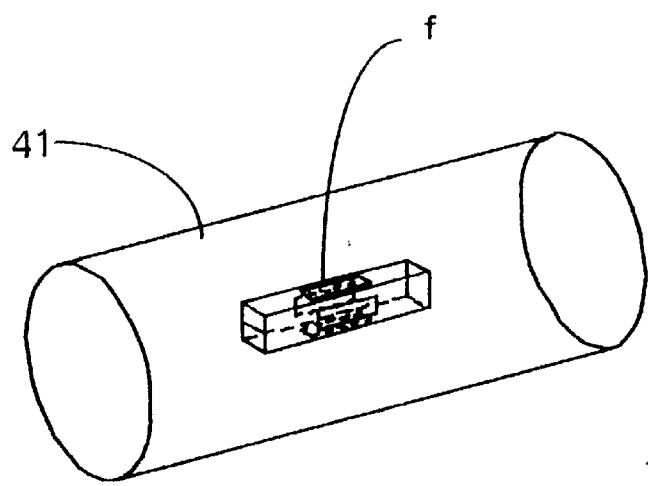
FIG. 19 is a schematic perspective view illustrating another sensor segment in a sensor hole.

FIG. 19 is a schematic perspective view illustrating another embodiment according to the present invention. Similarly, this embodiment can also determine the stress of each direction by calculating a change in resistance of the strain gauge.

A second embodiment of the measurement device according to the present invention will be described. The sensor segment "f" shown in FIG. 8 is installed in the sensor hole 41 and the circuit shown in FIG. 10 is employed.

When a force in the F direction is applied to the axle, the substrate 28 of the sensor segment receives the shearing strain. The strain gauges, "a" gauge 29 and "b" gauge 30, expand and these resistances change by $\Delta a$ and $\Delta b$. The strain gauges, "c" gauge 31 and "d" gauge 32, change in resistance by $\Delta c$ and $\Delta d$. The DSP 34 and CPU 35 determine a stress in the F direction by the following equation:

$$F = k_F\{(\Delta a + \Delta b) + (\Delta c + \Delta d)\} \tag{5}$$

When a force in the N direction is applied to the axle, the substrate 28 of the sensor segment receives contraction and expansion stress and it bends. The strain gauges, "a" gauges, 29 and "b" gauge 30, contract and expand and these resistance change by $-\Delta a$ and $\Delta b$. The strain gauges, "c" gauge 31 and "d" gauge 32, change in resistance by c and d. The DSP 34 and CPU 35 determine a stress in the N direction by $$N = k_N\{(\Delta b - \Delta a) + (\Delta c + \Delta d)\} \tag{6}$$

When a force in the S direction is applied to the axle, the substrate 28 receives contraction stress. The strain gauges, "a" gauge 29 and "b" gauge 30, contract and these resistances change by −Δa and −Δb. The strain gauges, "c" gauge 31 and "d" gauge 32, change in resistance by −Δc and −Δd. The DSP 34 and CPU 35 determine a stress in the S direction by $$S = -k_s\{(\Delta a + \Delta b) + (\Delta c + \Delta d)\} \tag{7}$$

When a force in the FB direction is applied to the axle, the substrate 28 receives expansion and contraction stress and it is twisted. The strain gauges, "a" gauge 29 and "b" gauge 30, expand and contract and these resistances change by Δa and −Δb. The strain gauges, "c" gauge 31 and "d" gauge 32, change in resistance by Δc and −Δd. The DSP 34 and CPU 35 determine a stress in the FB direction by $$FB = k_T\{(\Delta a - \Delta b) + (\Delta c - \Delta d)\} \tag{8}$$

A third embodiment of the measurement device according to the present invention will be described. Plural units of the sensor segment "f" shown in FIG. 8 are installed in the sensor hole 41.

When a force in the F direction is applied to the axle, a plurality of substrates 28 receive the shearing strain. By using values representing the change of the strain gauge, the DSP 34 and CPU 35 determine a stress in the F direction by Eq. 5 and the following equation:

$$F_{plural} = \sum_{n=1}^{m} F_n \tag{9}$$

When a force in the N direction is applied to the axle, a plurality of substrates 28 receive contraction and expansion stress and it bends. By using values representing the change of the strain gauge, the DSP 34 and CPU 35 determine a stress in the N direction by Eq. 6 and the following equation:

$$N_{plural} = \sum_{n=1}^{m} N_n \tag{10}$$

When a force in the S direction is applied to the axle, a plurality of substrates 28 receive contraction stress. By using values representing the change of the strain gauge, the DSP 34 and CPU 35 determine a stress in the S direction by Eq. 7 and the following equation:

$$S_{plural} = \sum_{n=1}^{m} S_n \tag{11}$$

When a force in the FB direction is applied to the axle, a plurality of substrates 28 receive expansion and contraction stress and it is twisted. The DSP 34 and CPU 35 determine a stress in the FB direction by $$FB_{plural} = \sum_{n=1}^{m} FB_n \tag{12}$$

Figure 20:
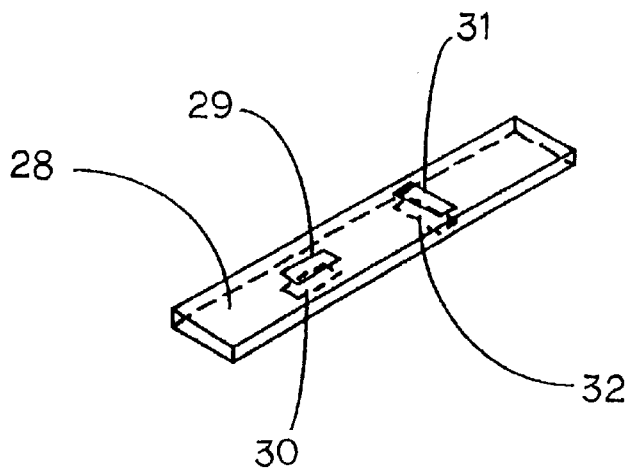
FIGS. 20 and 21 are schematic perspective views of examples of a plurality of sensor segments.
Figure 21:
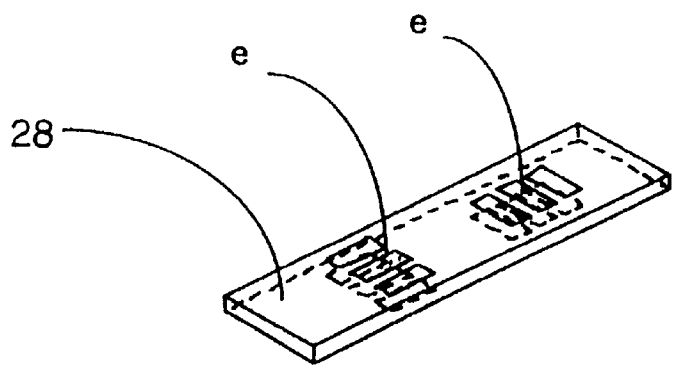
Figure 22:
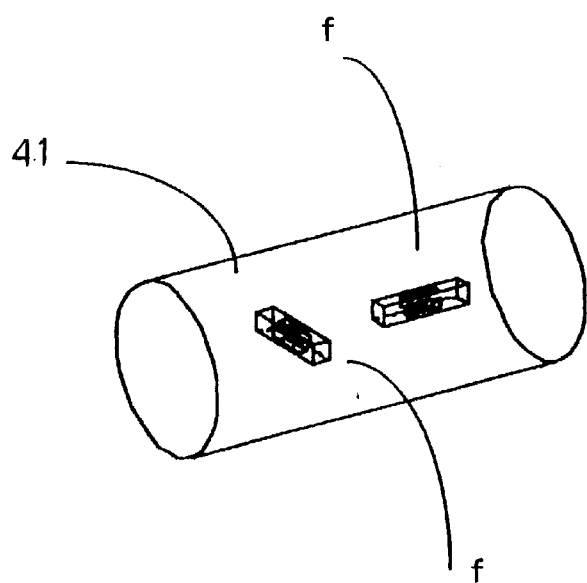
FIGS. 22, 23 and 24 are schematic perspective views illustrating the sensor segments in a sensor hole.
Figure 23:
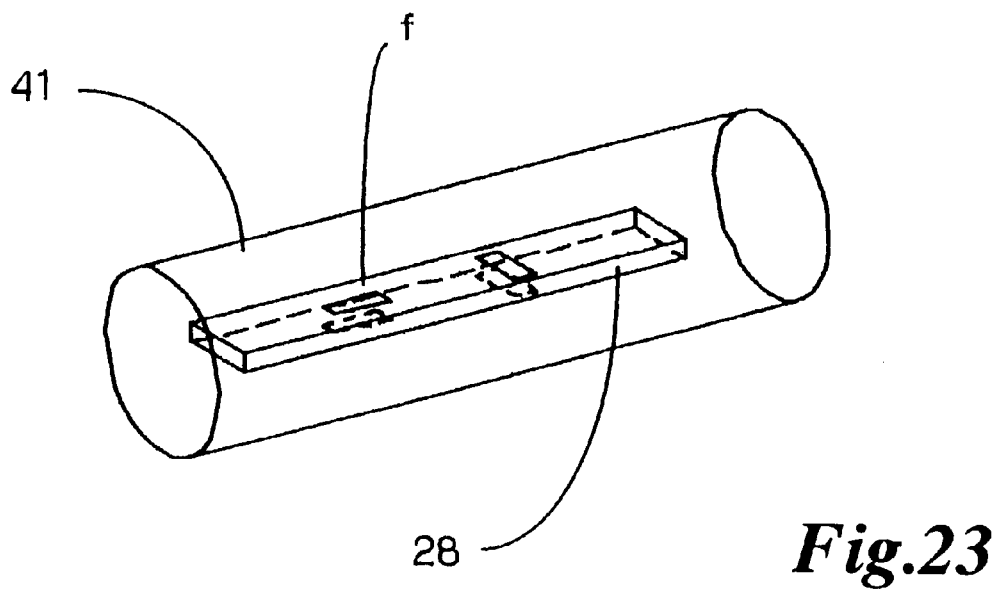
Figure 24:
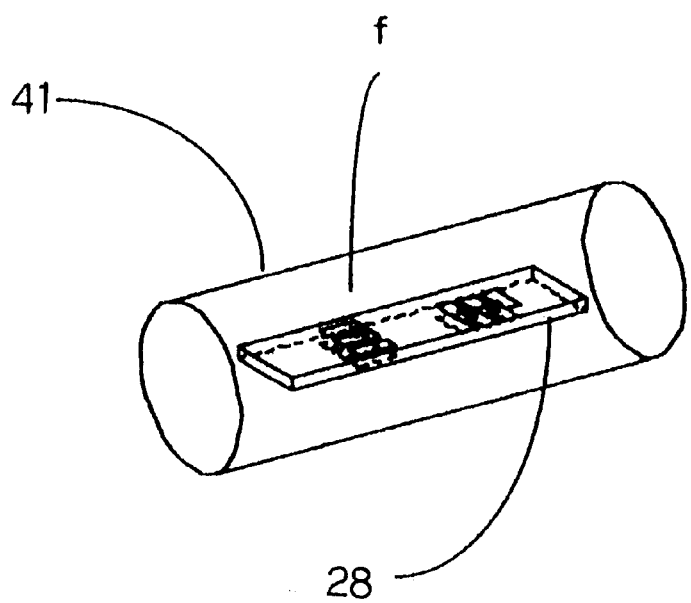

FIGS. 20 and 21 show examples of a plurality of sensor segments "f". FIGS. 22–24 are schematic perspective views illustrating the sensor segments "f" in the sensor hole 41.

Figure 25:
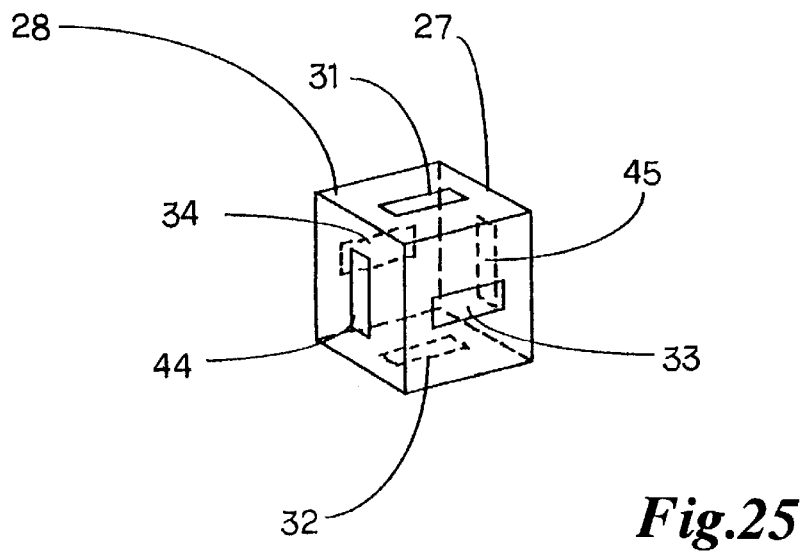
FIG. 25 is a schematic perspective view of a cubic sensor segment.

A fourth embodiment of the measurement device according to the present invention will be described. A sensor segment shown in FIG. 25 is installed in the sensor hole 41. A circuit of this device is similar to one shown in FIG. 10.

When a force in the F direction is applied to the axle, a cube substrate 28 receives the shearing strain. By using values representing the change of the strain gauge mounted on each face of the cube substrate, the operation is performed about each sensor segment, and a stress in the F direction is determined by $$F_{plural} = f_1 + f_2 + f_3 + \ldots \tag{13}$$

When a force in the N direction is applied to the axle, a cube substrate 28 receives contraction and expansion stress and it bends. By using values representing the change of the strain gauge mounted on each face of the cube substrate, the operation is performed about each sensor segment, and a stress in the N direction is determined by $$N_{plural} = n_1 + n_2 + n_3 + \ldots \tag{14}$$

When a force in the S direction is applied to the axle, a cube substrate 28 receives contraction stress. By using values representing the change of the strain gauge mounted on each face of the cube substrate, the operation is performed about each sensor segment, and a stress in the S direction is determined by $$S_{plural} = s_1 + s_2 + s_3 + \ldots \tag{15}$$

When a force in the FB direction is applied to the axle, a cube substrate 28 receives expansion and contraction stress and it is twisted. By using values representing the change of the strain gauge mounted on each face of the cube substrate, the operation is performed about each sensor segment, and a stress in the FB direction is determined by $$FB_{plural} = t_1 + t_2 + t_3 + \ldots \tag{16}$$

Figure 26:
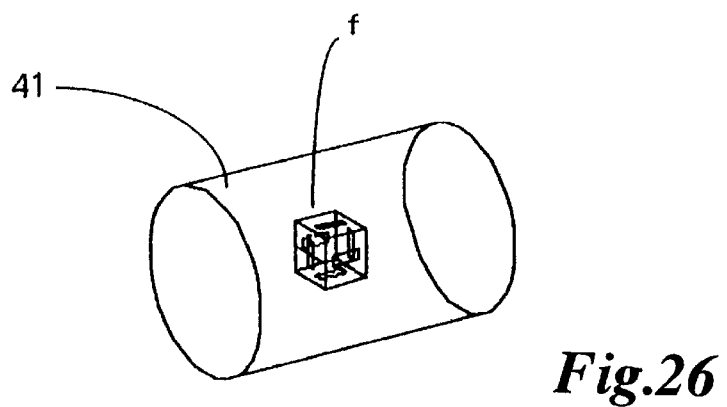
FIG. 26 is a schematic perspective view illustrating the cubic sensor segment in a sensor hole.

FIG. 26 is a schematic perspective view illustrating the sensor segment "f" in the sensor hole 41.

Figure 27:
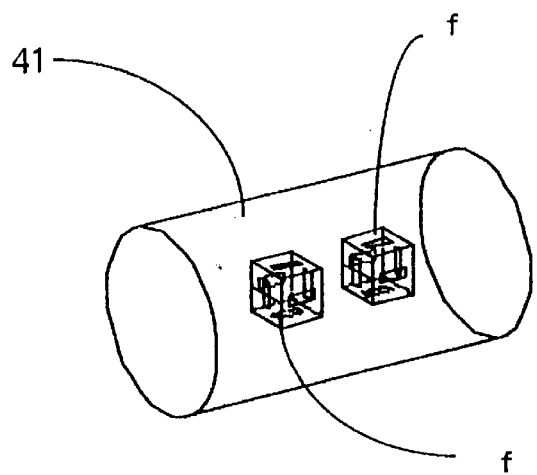
FIG. 27 is a schematic perspective view illustrating two cubic sensor segments in a sensor hole.

A fifth embodiment of the measurement device according to the present invention will be described. Plural units of the sensor segment shown in FIG. 25 are installed in the sensor hole 41. FIG. 27 is a schematic perspective view illustrating the two cubic sensor segments in the sensor hole 41. A circuit of this device is similar to one shown in FIG. 10.

When a force in the F direction is applied to the axle, the cube substrate 28 receives a shearing strain. By using values representing the change of the strain gauge mounted on each face of the cube substrate, a stress in F direction is determined by $$F_{whole} = \sum_{n=1}^{m} f_n \tag{17}$$

When a force in the N direction is applied to the axle, a cubic substrate 28 receives contraction and expansion stress and it bends. By using values representing the change of the strain gauge mounted on each face of the cube substrate, a stress in the N direction is determined by $$N_{whole} = \sum_{n=1}^{m} n_n \tag{18}$$

When a force in the S direction is applied to the axle, the cubic substrate 28 receives contraction stress. By using values representing the change of the strain gauge mounted on each face of the cubic substrate, a stress in the S direction is determined by $$S_{whole} = \sum_{n=1}^{m} s_n \tag{19}$$

When a force in the FB direction is applied to the axle, the cubic substrate 28 receives expansion and contraction stress and it is twisted. By using values representing the change of the strain gauge mounted on each face of the cubic substrate, a stress in the S direction is determined by $$FB_{whole} = \sum_{n=1}^{m} t_n \tag{20}$$

Figure 28:
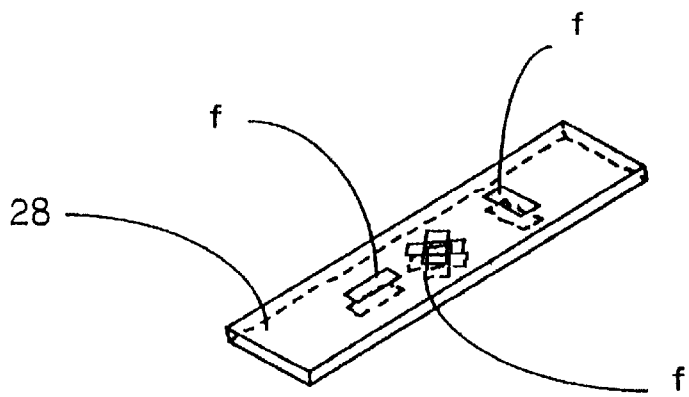
FIG. 28 is a schematic perspective view of an example of a sensor segment having uniaxial strain gauges and biaxial strain gauges.
Figure 29:
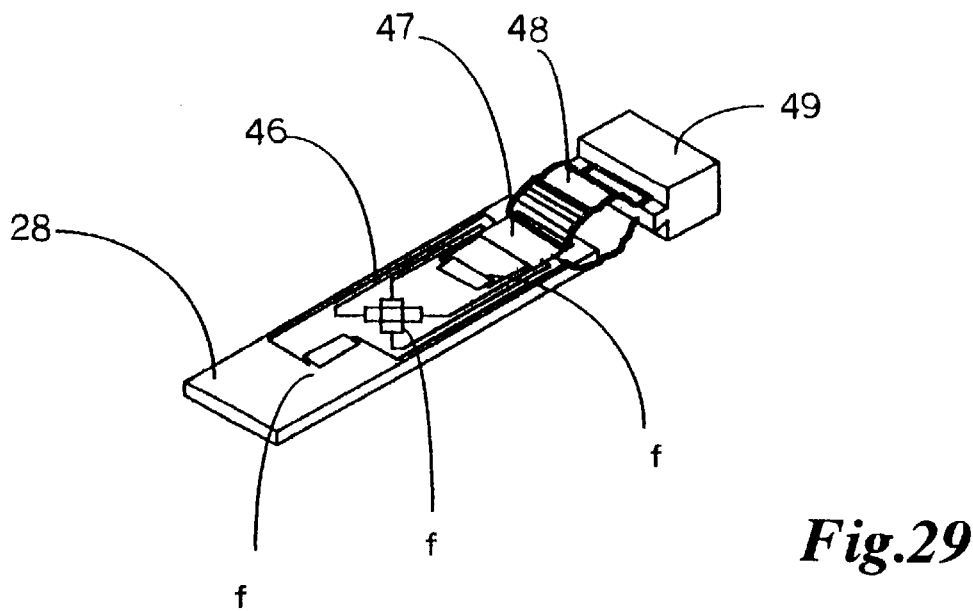
FIG. 29 is a schematic perspective view of an example of a sensor element having a plurality of sensor segments.
Figure 30:
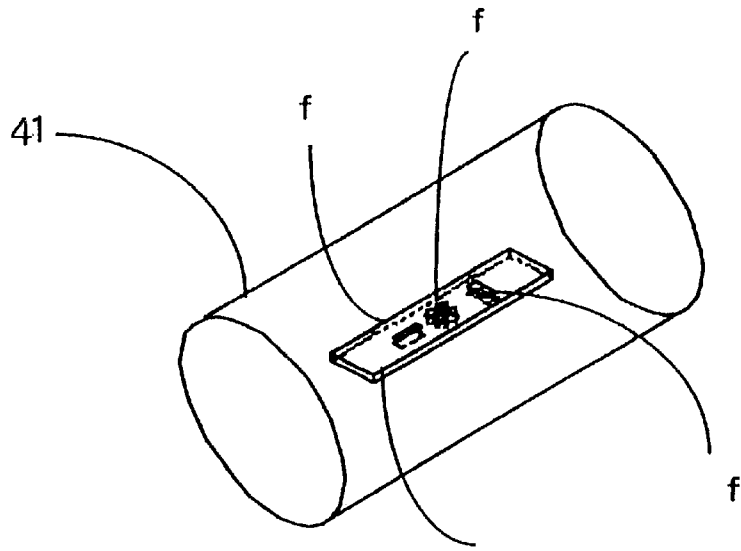
FIG. 30 is a schematic perspective view illustrating the sensor segment shown in FIG. 28 in a sensor hole.
Figure 34:
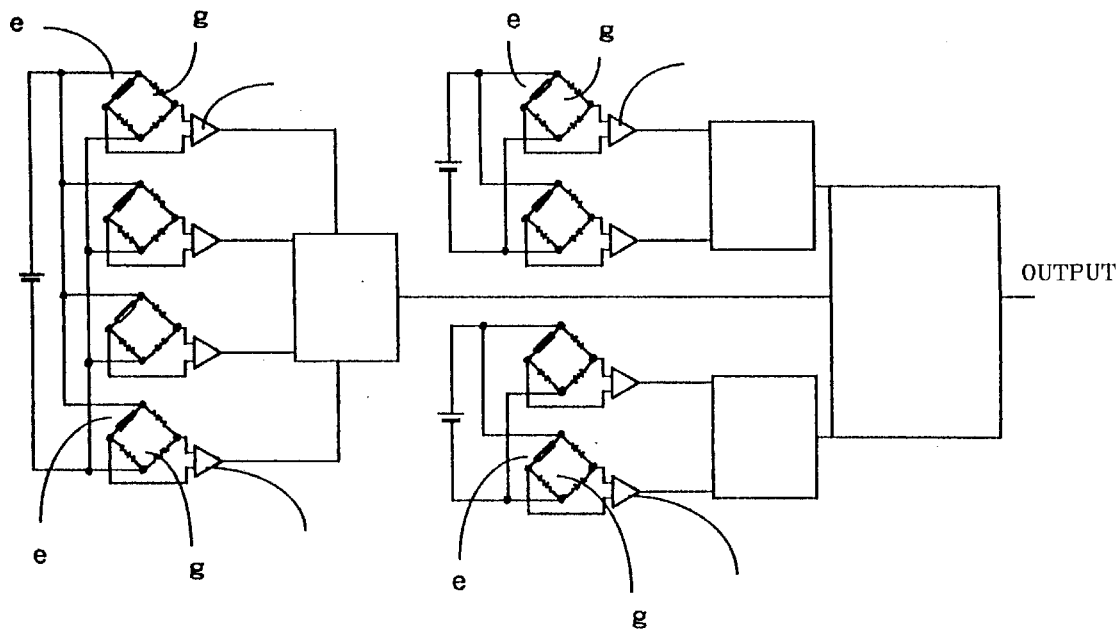
FIG. 34 is a block diagram of a stress sensor.

A sixth embodiment of the measurement device according to the present invention will be described. FIG. 28 shows an example in which the sensor segment employs the uniaxial strain gauges and a sensor segment employs a biaxial 90° strain gauges installed on the substrate 28. FIG. 29 shows a sensor element "g" in which a plurality of sensor segments "f" are mounted. A wiring 46, a electrode 47, a cable 48, and a connector 49 are attached on the substrate 28. FIG. 30 is a schematic perspective view illustrating the sensor segment "f" shown in FIG. 28 in the sensor hole 41. A circuit of this device can employ, for example, a circuit shown in FIG. 34.

When a force in the F direction is applied to the axle, the cubic substrate 28 of the sensor segment "f" receives a shearing strain. By using values representing the change of the strain gauge mounted on each face of the cubic substrate, a stress of F direction is determined by $$F_{whole} = \sum_{n=1}^{m} f_n^{single} + \sum_{n=1}^{m} f_n^{cross} \tag{21}$$

When a force in the N direction is applied to the axle, the cubic substrate 28 of the sensor segment "f" receives contraction and expansion stress and it bends. By using values representing the change of the strain gauge mounted on each face of the cubic substrate, a stress in the N direction is determined by $$N_{whole} = \sum_{n=1}^{m} n_n^{single} + \sum_{n=1}^{m} n_n^{cross} \tag{22}$$

When a force in the S direction is applied to the axle, the cubic substrate 28 of the sensor segment "f" receives contraction stress. By using values representing the change of the strain gauge mounted on each face of the cubic substrate, a stress in the S direction is determined by $$S_{whole} = \sum_{n=1}^{m} s_n^{single} + \sum_{n=1}^{m} s_n^{cross} \tag{23}$$

When a force in the FB direction is applied to the axle, the cubic substrate 28 of the sensor segment "f" receives expansion and contraction stress and it is twisted. By using values representing the change of the strain gauge mounted on each face of the cubic substrate, a stress in the FB direction is determined by $$FB_{whole} = \sum_{n=1}^{m} t_n^{single} + \sum_{n=1}^{m} t_n^{cross} \tag{24}$$

Figure 31:
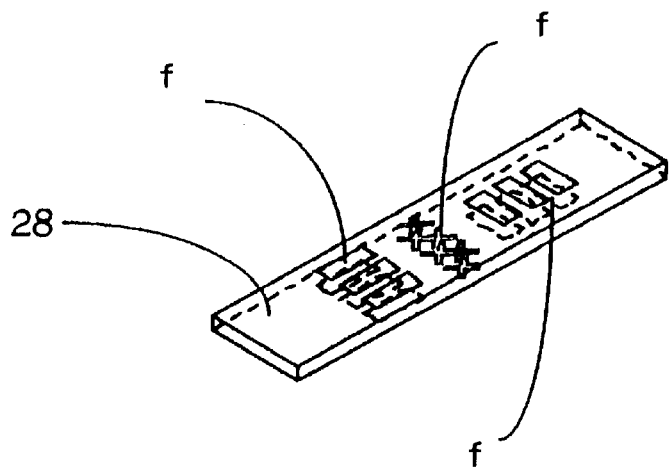
FIGS. 31, 32 and 33 are schematic perspective views of examples of sensor segments.
Figure 32:
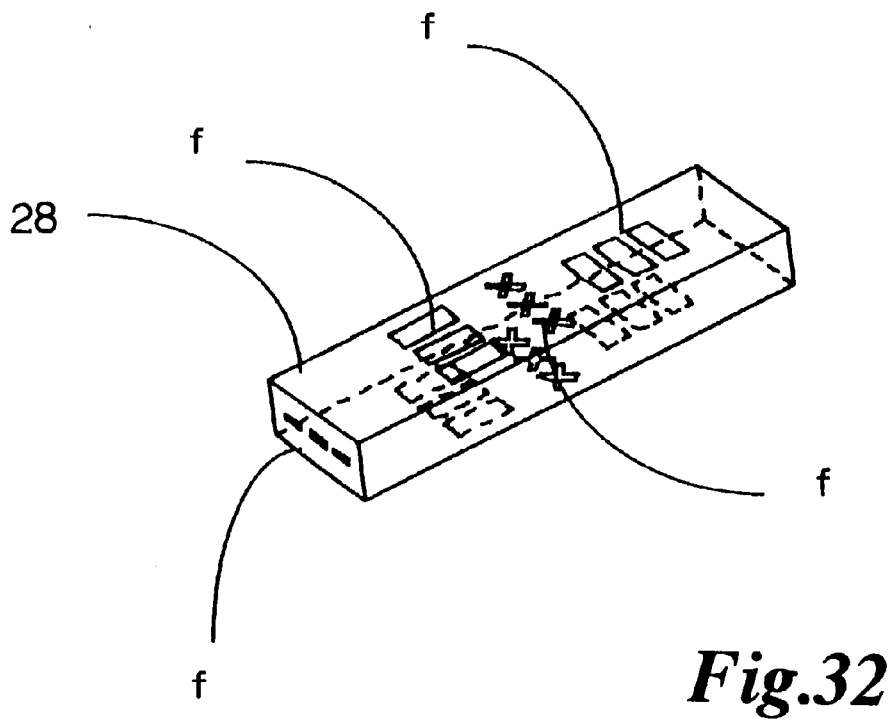
Figure 33:
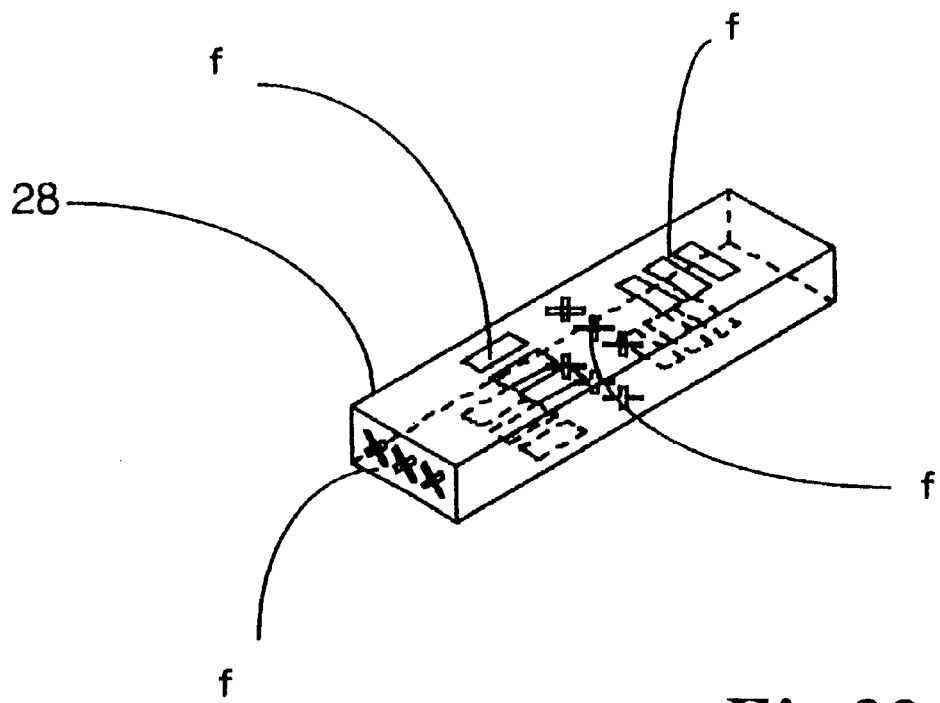
Figure 35:
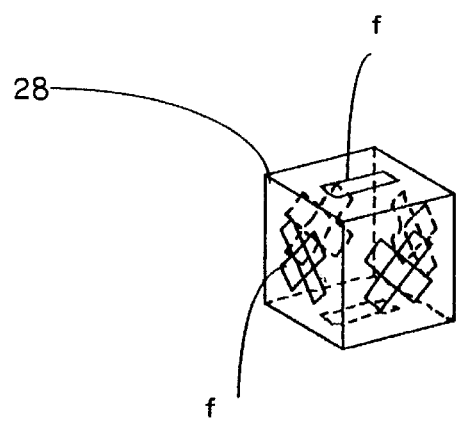
FIGS. 35 and 36 are schematic perspective views of examples of the sensor segments of a cubic substrate.
Figure 36:
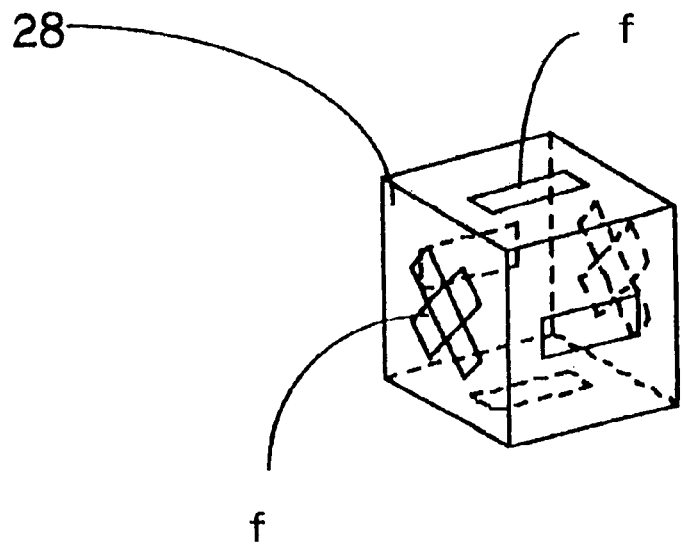
Figure 37:
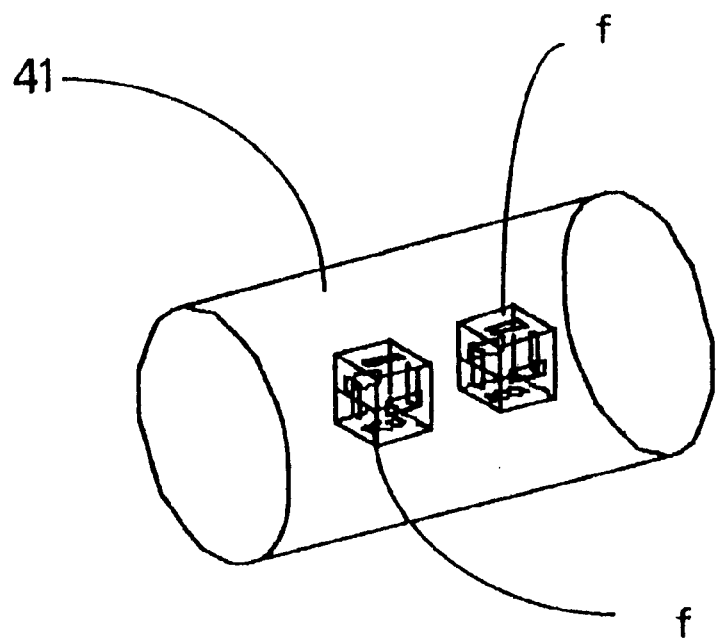
FIG. 37 is a schematic perspective view illustrating the cubic sensor segment in a sensor hole.

A seventh embodiment of the measurement device according to the present invention will be described. FIGS. 31, 32 and 33 show examples of a sensor segment having a substrate on which the strain gauge is mounted. FIGS. 35 and 36 show examples of a sensor segment with the strain gauge mounted on the cubic substrate. FIG. 37 is a schematic perspective view illustrating the sensor segment "f" in the sensor hole 41. A circuit of this embodiment can employ, for example, the circuit shown in FIG. 34.

When a force in the F direction is applied to the axle, the cubic substrate 28 of the sensor segment "f" receives a shearing strain. By using values representing the change of the strain gauge mounted on each face of the cubic substrate, a stress in the F direction is determined by $$F_{whole} = \sum_{l=1}^{\lambda} \left( \sum_{n=1}^{m} f_n^{single} + \sum_{n=1}^{m} f_n^{cross} \right) \tag{25}$$

When a force in the N direction is applied to the axle, the cubic substrate 28 of the sensor segment "f" receives contraction and expansion stress and it bends. By using values representing the change of the strain gauge mounted on each face of the cubic substrate, a stress in the N direction is determined by $$N_{whole} = \sum_{l=1}^{\lambda} \left( \sum_{n=1}^{m} n_n^{single} + \sum_{n=1}^{m} n_n^{cross} \right) \tag{26}$$

When a force in the S direction is applied to the axle, the cubic substrate 28 of the sensor segment "f" receives contraction stress. By using values representing the change of the strain gauge mounted on each face of the cubic substrate, a stress in the S direction is determined by $$S_{whole} = \sum_{l=1}^{\lambda} \left( \sum_{n=1}^{m} s_n^{single} + \sum_{n=1}^{m} s_n^{cross} \right) \tag{27}$$

When a force in the FB direction is applied to the axle, the cubic substrate 28 of the sensor segment "f" receives expansion and contraction stress and it is twisted. By using values representing the change of the strain gauge mounted on each face of the cubic substrate, a stress in the FB direction is determined by $$FB_{whole} = \sum_{l=1}^{\lambda}\left(\sum_{n=1}^{m} t_n^{single} + \sum_{n=1}^{m} t_n^{cross}\right) \quad (28)$$

An eighth embodiment of the measurement device according to the present invention will be described.

By the calculations described in the first embodiment to the seventh embodiment, stress in the F direction which is equivalent to the horizontal direction with respect to the road surface, stress in the N direction which is equivalent to the vertical direction with respect to the road surface, stress in the S direction which is equivalent to the axle center direction, and stress in the FB direction which is equivalent to the direction of the torsional moment about the axle are determined.

Figure 38:
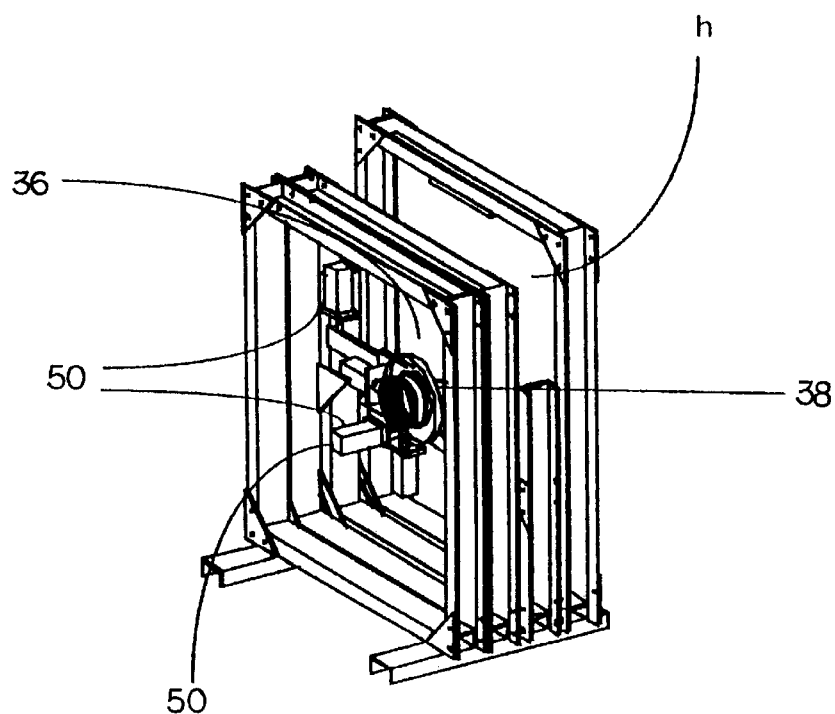
FIG. 38 is a schematic perspective view of a test rack.

The axle structure installed the sensor for detecting stress is fixed to a test rack as shown in FIG. 38. Then, force having directions of x", axis "f", y axis "g", z axis "h", and the torsional moment of y axis "g" are applied by an oil hydraulic cylinder 50. Table 1 shows the output from the sensor segment.

TABLE 1

|  | COMPO-NENT f | COMPO-NENT n | COMPO-NENT t | COMPO-NENT s |
| --- | --- | --- | --- | --- |
| LOAD F | $f_1$ | $n_1$ | $t_1$ | $s_1$ |
| LOAD N | $f_2$ | $n_2$ | $t_2$ | $s_2$ |
| LOAD T | $f_3$ | $n_3$ | $t_3$ | $s_3$ |
| LOAD S | $f_4$ | $n_4$ | $t_4$ | $s_4$ |

The axle structure is used within elastic deformation thereof. Therefore, the output of the sensor segment and the load have a proportional relationship. This relationship may be represented by the following equations:

$$F_{original} = a_1 x \quad (29)$$

$$N_{original} = a_2 x \quad (30)$$

$$S_{original} = a_3 x \quad (31)$$

$$FB_{original} = a_4 x \quad (32)$$

The relationship about double, triple, and quadruple load may be represented by the following equations:

$$F_{double} = \beta_1 x \quad (33)$$

$$F_{trio} = \gamma_1 x \quad (34)$$

$$F_{quart} = \delta_1 x \quad (35)$$

By using Eqs. 29, 33, 34 and 35, the variation $\Delta F$ may be represented by the following equation:

$$\Delta F = (a_1 - \delta_1)x = \psi_1 \theta \quad (36)$$

A linear expression for transforming from strain to force is produced by experiment so as to transform from x to θ. By using Eqs. 33 and 36, pure force in the F direction can be determined by the following equation:

$$F_{pure} = F - \psi_1 \theta \quad (37)$$

Calculation for eliminating cross talk is performed by CPU or DSP.

A ninth embodiment of the measurement device according to the present invention will be described. For high-accuracy measurement of an object stress, the position of the sensor is an important factor. Therefore, it is desirable that the sensor segment "f" is positioned at a neutral point which is unaffected by any other spurious force. The neutral point can be determined on the basis of the stress distribution of the axle structure, which is inspected by means of a finite element method, or the like. The size of the neutral point varies with respect to the shape of the axle structure. Therefore, it is desirable to use a small sensor.

Figure 39:
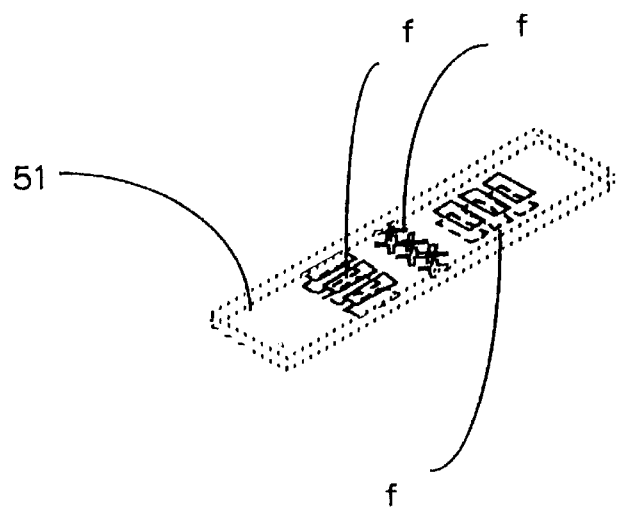
FIGS. 39, 40 and 41 are schematic perspective views of examples of the substrate made by adhesive material.
Figure 40:
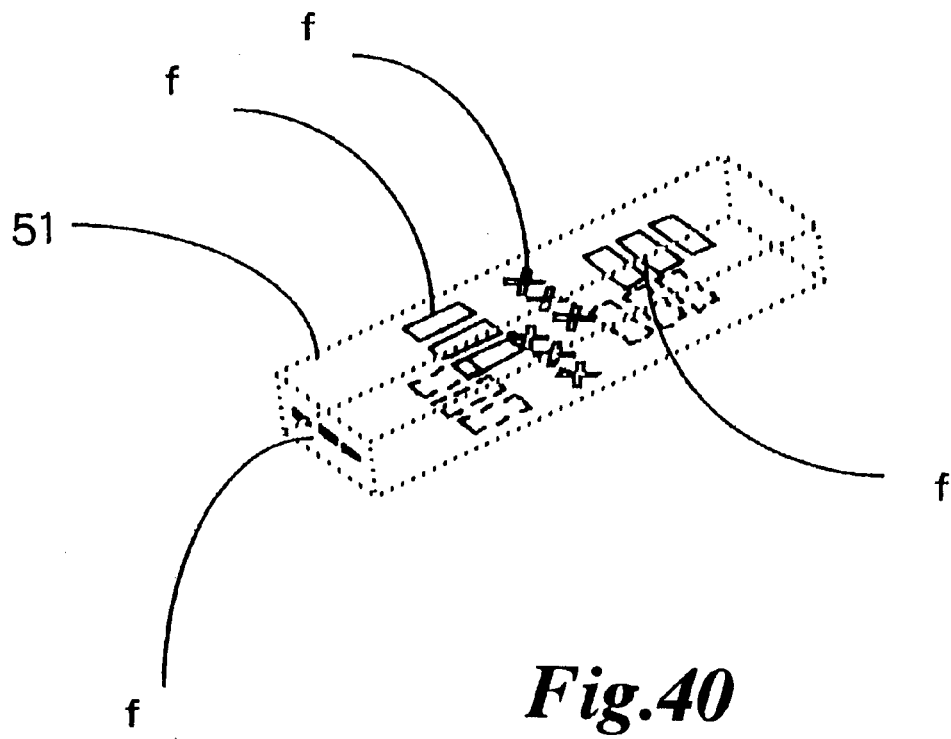
Figure 41:
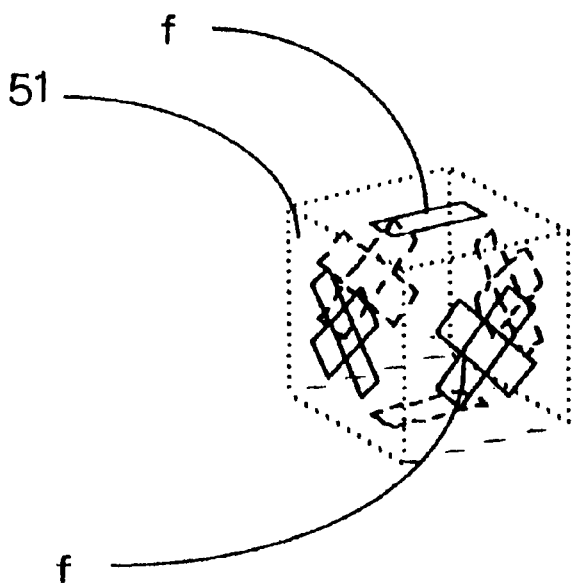
Figure 42:
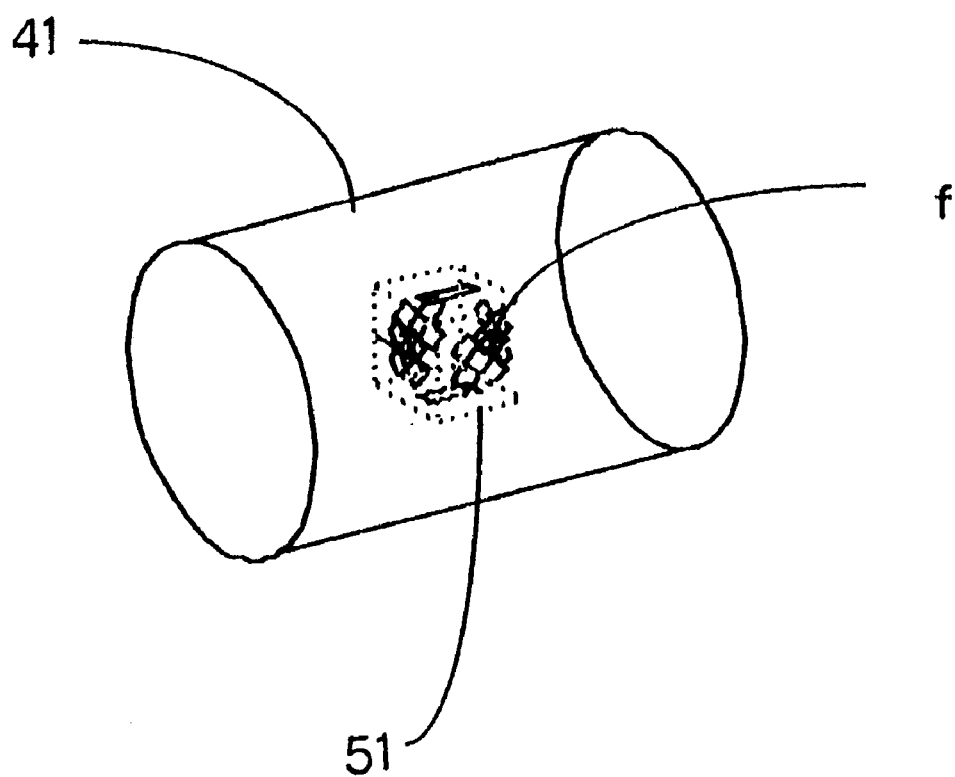
FIG. 42 is a schematic perspective view illustrating the sensor segment having the substrate made by the adhesive material in a sensor hole.

Another embodiment of the measurement device according to the present invention will be described. The embodiments mentioned above employ the sensor segment having a strain gauge, but it is not restricted to a strain gauge. All other elements which are able to produce variation by strain can be used for the measurement device of the stress according to the present invention. Furthermore, the substrate itself can be made by using an adhesive material, functioning as the adhesives for the strain gauge in the hole. FIGS. 39 to 41 are the schematic perspective views illustrating examples of the substrate made by the adhesive material and FIG. 42 is a schematic perspective view illustrating the sensor segment having the substrate made by the adhesive material in the sensor hole 41.

In the embodiments described above, the strain gauge is employed as the stress detecting element, but it can also employ a semiconductor pressure gauge, an optical fiber, etc.

The sensing means for detecting the stresses acting on the vehicle wheel is attached into the small hole which is drilled at the stress measurement point of the axle of the vehicle or the structure located adjacent to the axle. The joint between the sensing means and the hole, for example, is achieved by the following methods:

A tapered hole is drilled in the axle structure. The sensing means is embedded into a tapered pipe-like case. The tapered pipe-like case having the sensing means is tightly fitted into the tapered hole. It is also advisable to use simultaneously a clamping screw or adhesives.

Another method is to use silicide layer such as an alloy-silicide of gold and silicon. A hole is drilled in the axle structure. The sensing means is embedded into a pipe-like case. Gold is coated either on an inner wall of the hole or an outside of the pipe-like case. The other wall or side is coated by silicon. The pipe-like case is inserted into the hole. The alloy-silicide is grown by a thermal diffusion method, thereby the sensing means is tightly attached into the hole.

The present invention may be embodied in other specific forms without departing from the spirit or essential characteristics thereof. The embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

I claim:

1. A control method for antilock braking systems, the systems employing at least one stress sensor means and a signal processing unit to which the at least one stress sensor is connected, the method comprising the steps of:

detecting outputs of the at least one stress sensor means which are proportional to a road surface friction force F and a braking torque T, respectively;

applying said outputs to the signal processing unit and calculating a parameter M, wherein M=F−T;

calculating a value $M_\omega$, by integrating M=F−T;

establishing a predetermined threshold TH for M and reducing brake pressure when M reaches TH;

calculation a reference line for $M_\omega$ starting at a time before M reaches TH to a time after M reaches TH; and releasing brake pressure when said time after M reaches TH is reached.

2. The method as defined in claim 1, wherein TH is determined as a function of road surface coefficient $\mu$.

3. The method as defined in claim 1, wherein said time before M reaches TH is determined as a function of road surface coefficient $\mu$.

4. The method as defined in claim 1, wherein the signal processing unit calculates a maximum value of $\mu$, and calculates said predetermined threshold value TH and/or said time before M reaches TH as a function of said maximum value of $\mu$.

5. The method as defined in claim 1, wherein the signal processing unit calculates a value of $\mu$ at a time when a derivative value of F reaches its peak, estimates a maximum value of $\mu$, and presets TH and/or said time before M reaches TH as a function of said maximum value of $\mu$.

6. The method as defined in claim 1, wherein the signal processing unit calculates a value of $\mu$ at a time when a second derivative value of F becomes negative, estimates a maximum value of $\mu$, and presets TH and/or said time before M reaches TH as a function of said maximum value of $\mu$.

* * * * *

UNITED STATES PATENT AND TRADEMARK OFFICE
CERTIFICATE OF CORRECTION

PATENT NO. : 5,979,995
DATED : November 9, 1999
INVENTOR(S) : Nagao Miyazaki

It is certified that error appears in the above-identified patent and that said Letters Patent is hereby corrected as shown below:

Claim 1, column 15, line 6, "releasing" should be --terminating said--, and between "pressure" and "when" --reduction process-- should be inserted.

Claim 5, column 16, line 5, "$\mu$at" should be --$\mu$ at--.

Signed and Sealed this

Fifth Day of September, 2000

Attest:

Q. TODD DICKINSON

*Attesting Officer*    *Director of Patents and Trademarks*